Sept. 25, 1934. W. A. BLACK 1,974,842
CAMERA
Filed July 18, 1933. 10 Sheets-Sheet 1

INVENTOR
William A. Black
BY
Hoguet & Neary
ATTORNEYS

Sept. 25, 1934.  W. A. BLACK  1,974,842
CAMERA
Filed July 18, 1933  10 Sheets-Sheet 2

Sept. 25, 1934.  W. A. BLACK  1,974,842
CAMERA
Filed July 18, 1933  10 Sheets-Sheet 3

INVENTOR
William A. Black
BY
August Neary
ATTORNEYS

Sept. 25, 1934.  W. A. BLACK  1,974,842
CAMERA
Filed July 18, 1933   10 Sheets-Sheet 5

INVENTOR
William A. Black
BY
ATTORNEYS

Sept. 25, 1934.  W. A. BLACK  1,974,842
CAMERA
Filed July 18, 1933   10 Sheets-Sheet 7

Patented Sept. 25, 1934

1,974,842

UNITED STATES PATENT OFFICE

1,974,842

CAMERA

William A. Black, Montclair, N. J., assignor to Fairchild Aerial Camera Corporation, Woodside, N. Y., a corporation of New York Application July 18, 1933, Serial No. 680,914

17 Claims. (Cl. 88—17)

This invention relates in general to cameras and more particularly to film cameras of the type particularly suited for aerial photography.

An object of the invention is to provide a camera which will include mechanism for creating a vacuum at the proper predetermined interval in the cycle of operation of the camera for holding the film flat over the photographic exposure area during the photographic exposure interval, and at the same time provide for a minimum number of added parts for bringing this about, and at the same time arrange such parts so that the vacuum system will be self-contained, and so that the desired result will be obtained in the most positive and efficient manner.

Another object of the invention is to provide such a camera that may be operated manually, or automatically, and also to provide new and improved clutch devices for making the manual and automatic drives possible without danger of malfunction.

Another object is to provide an improved counter device for the registering of the number of pictures taken, which counter device will include mechanism whereby it will automatically be returned to a normal, zero reading upon the removal of the magazine cover from the magazine.

Another object of the invention is to provide a camera having interchangeable magazines, drive and cone units, the drive being so arranged that there will be a single driving connection, not only from the film wind in the driving unit to the magazine but also a single connection between the driving unit and magazine for regulating the operation of the vacuum creating device.

Another object of the invention is to provide an improved shutter tripping device, employing a solenoid and an improved switching device for opening and closing the circuit for the camera driving motor.

Another object is to provide an improved retard device which will make for a proper predetermined sequence of operation of the vacuum system and the shutter trip, and for a definite time interval therebetween, so as to insure the holding of the film flat during exposure and the release thereof upon completion of the exposure, and so as to make the operation of the vacuum system instantaneous in its appliance and release.

Another object is to provide a single positive means coacting with the operation of the film winding mechanism, the vacuum creating device and the measuring roll, so as to positively effect a predetermined sequence of operation of the three correlated functions performed thereby.

A further object is to provide a novel means for creating vacuum for holding the film flat during the exposure period, to provide an improved valve means therefor, and also to provide an improved valve actuation device in conjunction therewith.

With the foregoing and other objects in view, the invention resides in the combination of parts and in the details of construction set forth in the following specification and appended claims, certain embodiments thereof being illustrated in the accompanying drawings, in which:

Referring more particularly to the drawings, the camera generally comprises three units, namely, the magazine M, the driving unit D containing the driving mechanism and a cone C, while there is represented at H a suitable grip for disposing the camera at any desired angle.

These three units are made interchangeable as is the customary practice in cameras generally known to the trade as Fairchild aerial cameras.

Figure 3:
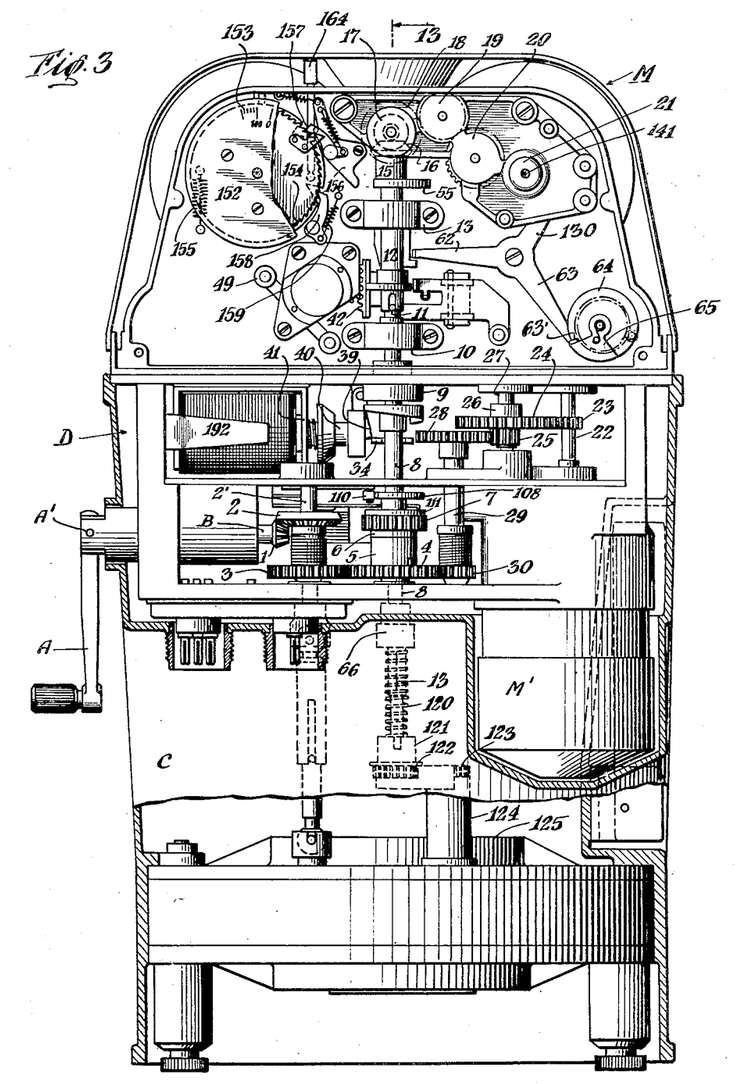
Figure 3 is a view in front elevation of the camera with the front cover of the three units removed.
Figures 13, 20:
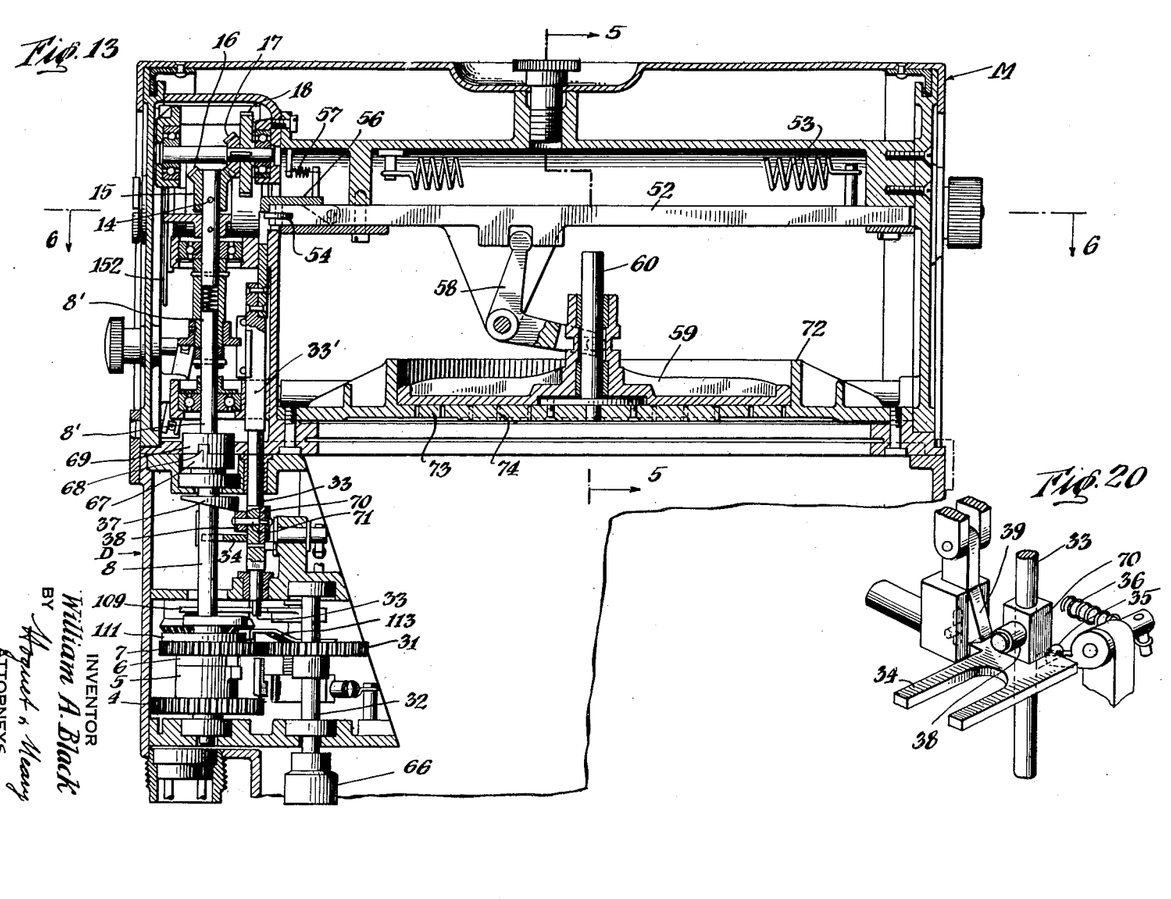
Figure 13 is a view in section taken along line 13—13 of Figure 3.
Figure 20 is a detailed view in perspective of the plunger for operating the vacuum creating device and its relationship with other working parts.
Figure 14:
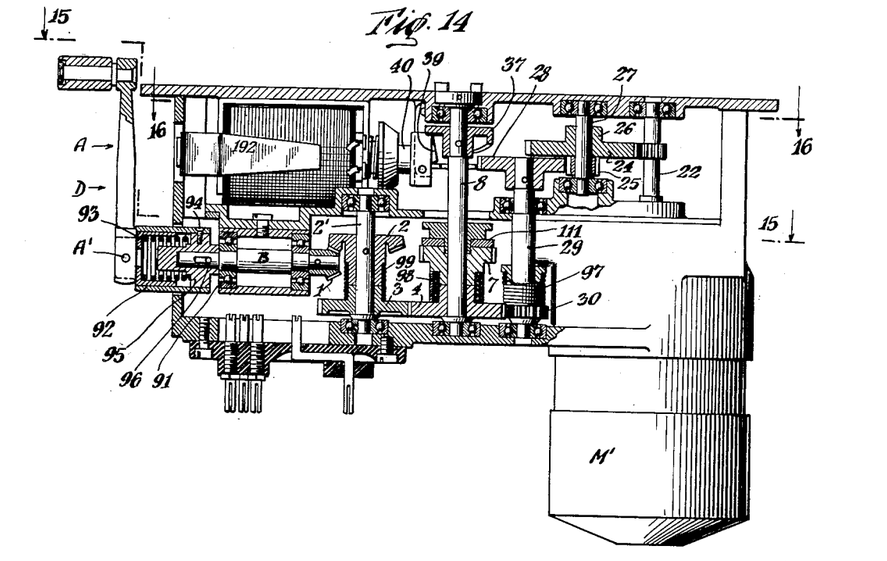
Figure 14 is a view in section taken along line 14—14 of Figure 15.

Referring more particularly to Figures 3, 13 and 14, the film may be wound manually by means of a crank A or a motor M'. Taking up the means for manual winding, the crank A may be pivoted at A' so as to be reversible in case it is desired to move it completely out of the way when not being used for effecting the rotation of a shaft B. This shaft B carries a bevel gear 1 which meshes with another bevel gear 2 carried on a shaft 2' which drives a gear 3 through a suitable spring clutch to be later described. Gear 3 meshes with gear 4 and through the medium of a clutch device 5, 6, later to be described, rotates gear 7 carried by shaft 8, which latter rotates in a bearing 9, and also in a bracket 10, and is keyed at 11 to a sleeve 12, which rotates in a bearing in bracket 13. Sleeve 12 is keyed at 14 to a sleeve 15 carrying a bevel gear 16 meshing with a bevel gear 17, carried on the same shaft as a larger gear 18, meshing with a gear 19, which drives a larger gear 20 to drive gear 21 which is carried on the film drive shaft on the winding reel for the film so as to effect a winding of the film upon the operation of the crank.

A gear train for the motor drive from the motor M' consists in a motor shaft 22 rotating a small gear 23, meshing with a larger gear 24, carried on a sleeve 26 rotatable with a shaft 27, gear 24 being rotatable with a smaller gear 25 which drives a larger gear 28 on a rotary shaft 29. This shaft 29 through the medium of a clutch later to be described drives a gear 30, which meshes with the large gear 4 and the drive from that point is the same as described in connection with the manual drive for the film wind.

Referring to Figure 13, the winding of the shutter is effected at the same time and by the same manual or motor drive means as the winding of the film and is brought about by the meshing of gear 7 with gear 31, carried by a shaft 32, which carries at its lower end a socket 66 adapted for releasable and interchangeable connection for a shaft extending downwardly to the shutter in the cone, as is the usual practice in aerial cameras, it being understood that the shutter is wound during each cycle of operation, which includes the winding of the film and the simultaneous winding of the shutter, the subsequent tripping of the shutter and the exposure of the film.

Also, during each cycle of operation, there is brought into play apparatus for holding the film flat over the exposure area at a predetermined interval and held there during the exposure period and this means must necessarily not be brought into play until such predetermined time and must be released immediately after the exposure, so that it will not interfere with the winding and consequent forward movement of the film into its proper place for the next exposure. To bring this about, there is provided (see Figs. 13 and 20) a reciprocatory plunger 33 mounted adjacent the rotary shaft 8 in the driving unit of the camera. The film winding shaft 8 is provided at its upper extremity with an enlarged collar 67 flush with the upper extremity of the driving unit and having a projecting key 68, there being provided in the magazine unit a complementary collar 69 with a recess adapted to fit the key 68, the upper part of the shaft 8 being indicated at 8'. A similar arrangement is provided for a plunger 33, in that its complementary counterpart in the magazine is shown at 33', there being an aperture in the lower part of the magazine casing and the upper face of the driving unit, so that plunger 33' is effectively a continuation of plunger 33. This plunger 33 carries a block 70 which bears down on an arm 35, which is spring actuated upwardly by a tension spring 36, so as to be normally urged in an upward direction. As the film is wound, either by hand or motor, the plunger 33 is forced down by a cam 37, bearing down on a roller 38 carried by the plunger 33 and secured to the block 70 at 71. This cam has an abrupt high point and low point, so as to free the plunger at a predetermined point, so as to be drawn upwardly by the spring 36 after the shutter has been tripped. Before this upward movement can occur, however, the solenoid catch 39 must be removed from its position shown in Figs. 3 and 20. As the plunger 33 is brought down during the film winding operation, the spring 41 around the solenoid shaft 40 forces the catch 39 of the solenoid 300 to fit in behind a fork 34 carried by the plunger 33, and as long as the shutter remains untripped, the catch 39 keeps the plunger in this position until the shutter is tripped, at which time the shaft 40 is moved to the left, releasing the engagement of the catch 39 with the fork 34.

Figure 4:
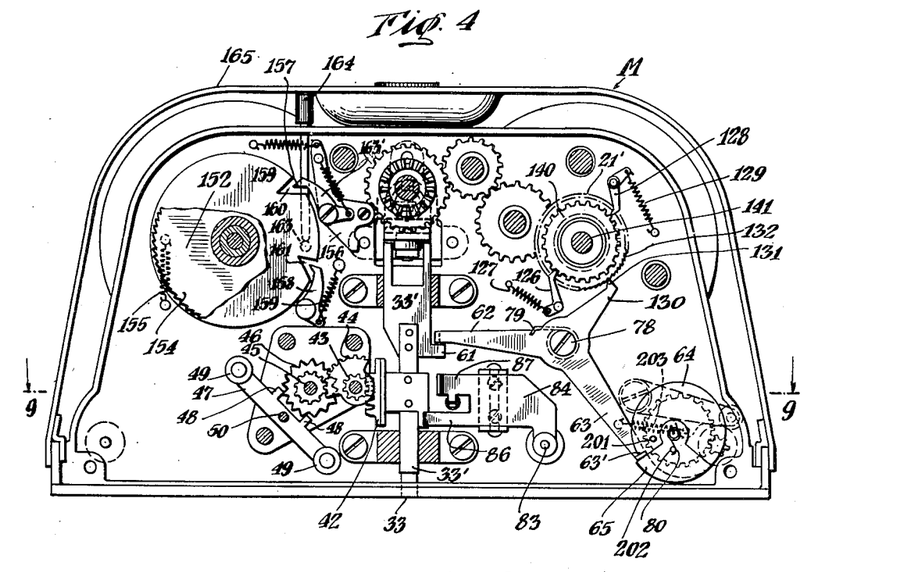
Figure 4 is a similar view of a magazine unit with certain other covering plates removed.
Figure 5:
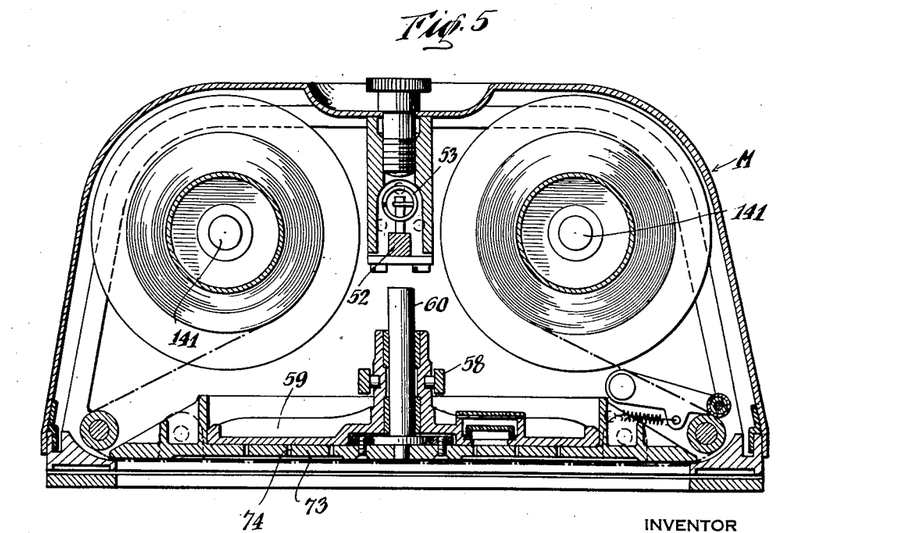
Figure 5 is a view similar to Figure 4 with most of the operating parts removed so as to more clearly show the arrangement of the vacuum creating piston and taken along line 5—5 of Figure 13.

Referring to Figure 4, the plunger 33' carries a rack 42 which works a pallet retard providing a uniform movement of the plunger as it is moved upwardly and downwardly and this for the purpose of providing for a proper sequence of operation of the vacuum system and the shutter trip and for a definite time interval between these operations. This is brought about by the meshing of the rack 42 with a small gear 43 carrying a larger gear 44, meshing with a smaller gear 45, carrying a pallet wheel 46, which is alternately engaged by forks 48 of a pallet bar 47 pivoted at 50, and which may be provided with suitable weights, such as 49.

As the rack 42 and bar 33' move upwardly upon the release of the solenoid from the bar 33, the forked plate 51 carried thereby (see Figure 10) moves up allowing spring 53 to pull a bar 52 to the left. As this occurs the forks of the plate 51 push upwardly on a pivoted catch 56, removing the same from the end of the bar 52 against the action of a spring 57. This movement of the bar to the left causes a counterclockwise movement of a bellcrank 58, as shown in Figure 13, and the consequent upward movement of a piston 59 through a suitable connection with the piston which is provided with a guide 60. The suction device is so arranged as to consist of the piston 59, fitting within a cylinder 72, open at its upper extremity and being provided in its lower wall 73 with a plurality of apertures 74. Continuous with this lower wall of the cylinder is a plate 75, in the form of a grid, having grooves 76 and 77 for distributing the suction effect created in the cylinder throughout the entire face of the plate 75, by means of communication between the apertures 74 and the cross-grids or channels 76 and 77. The effect of this is to distribute the suction effect throughout the entire face of the plate 75 so as to make uniform the drawing of the film flat against the face over the entire area of the exposure plane.

Referring more particularly to Figure 4, the upward movement of the bar 33', which occurs after the shutter has been tripped, forces an arm 62 of a device, pivoted at 78, upwardly against the action of a spring 79 by means of the engagement of a lug 61 with the arm 62. The effect of this is to pull arm 63 in a clockwise direction, also against the action of spring 203, so as to release a lug 63' out of engagement with the corresponding recess in a measuring roll 64. As long as this lug 63' is in engagement with the notch in the measuring roll, it is impossible to advance the film and such engagement is pre-determined and correlated to the operation of the remaining parts of the device so as to occur in proper sequence. As soon as the lug 63', is withdrawn from the notch in the measuring roll a plate 65, carried by the measuring roll is spring actuated by a spring 80 acting against pin 202 so as to move in a clockwise direction and cover up the recess in the measuring roll so as to prevent the swinging of the lug 63' back into the notch until after a complete cycle and a complete revolution of the measuring roll takes place. The edge roll 64 is also provided with a pin 201 which limits the movement of the plate 65 under the urging of spring 80 so that the plate is stopped when it strikes pin 201 in which position the notch 63' is closed.

Figure 9:
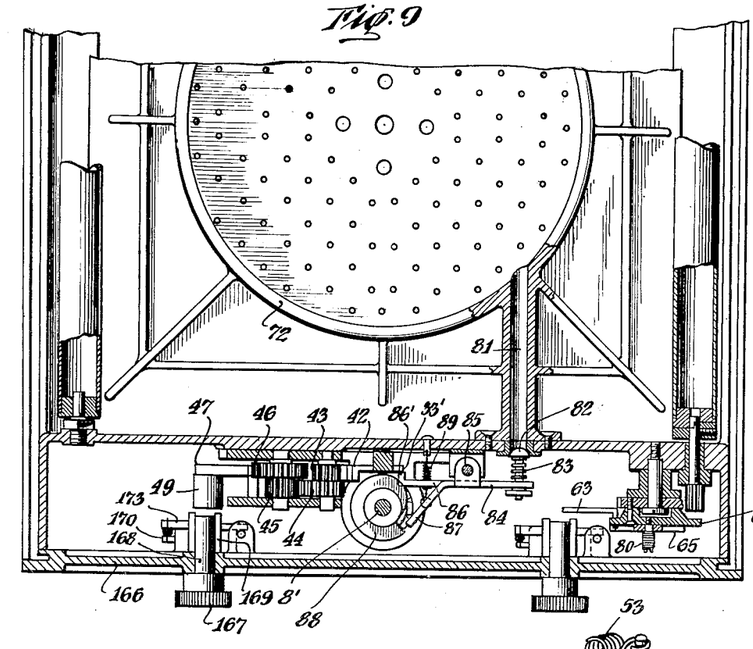
Figure 9 is a view in section taken along line 9—9 of Figure 4.

The vacuum system has been described with the exception of the valve means and the actuating mechanism therefor. As explained before, the upward movement of the piston is brought about by the bell crank 58 as the bar 52 is moved to the left, as shown in Fig. 13, and the suction is created as the piston is in its upward position. In order to destroy the vacuum at a predetermined time a passageway 81 is arranged so as to extend into the cylinder and is provided with a valve seat to accommodate an exterior valve 82 urged against its seat by a spring 83 when the pivoted plate 84 is in the position shown in Fig. 9. This plate is pivoted to the casing at 85 and is provided with an angular prong 87 and a straight prong 86 with a depending lug 86'. Prong 87 rides on a cam 88 carried by the film winding shaft 8' and the position of the parts, as shown in Fig. 9, is suitable for the tripping of the shutter. The valve 82 has been closed during that part of the counterclockwise rotation of cam 88 in which prong 87 has been riding on the high part of the cam. In the position shown in Fig. 9, however, the prong 87 does not engage the cam but the lug 86' of the prong 86 in resting on the bar 33', retains the plate 84 against pivotal action urged by tension spring 89 and the valve still remains closed. With the valve 82 closed it will be seen that the upward movement of the piston previously described will cause a vacuum to be created.

The tripping of the shutter, as explained in conjunction with Figure 3 and the description of the action of the plunger 33 and 33' allows the plunger 33' to be moved upwardly and out of the way of prong 86 so that the latter is swung inwardly by spring 89 and the valve 82 is thus opened to allow air in the cylinder so as to destroy the vacuum set up. As an aid to the escape of air from the cylinder on the down movement of piston during the film winding operation, there are provided any number of suitable check or flap valves 90 at suitable places so as to exhaust the air through screened outlets 90'.

As shown in Fig. 14, the rotation of the crank A in a forward direction imparts a consequent rotary movement to a shaft B, carrying a gear 2, which puts into operation a train of gears and shafts to effect the winding of the film. This shaft B is journalled in suitable ball bearings 91 and a plunger is provided for the purpose of allowing the crank to be pivoted into and out of operative position. This arrangement may consist of a plunger 92 connected to a coil spring 93, which is also attached at 94 to a block 95 keyed to shaft B at 96, in such a manner as to allow for the pivotal movement of the crank about its pivot A' and to have the crank snapped into its desired position due to the action of the spring 93 as the lower edge of the crank depresses the plunger 92 in the pivotal movements of the crank. A spring clutch device may be provided for the motor drive and is indicated at 97, the same to be so arranged with a divided shaft, that upon the rotation of the shaft 29 through the medium of the motor shaft 22 and the intervening train of gears, the gear 30 will drive gear 4, as before explained.

The clutch is also arranged, however, so that a rotation of gear 4, by manual means, will rotate the gear 30, but no movement will be imparted to the shaft 29 as the coil spring 97 is being loosened. A similar clutch is provided for a rotation of shaft 2', the coil spring 99 being coiled around the separate and abutting sleeves of gears 2 and 3, the sleeve of gear 2 being secured to shaft 2', so that rotation of the driving element B in one direction, through the medium of the coil spring 99, will impart a corresponding rotary drive to gear 3, while a drive of gear 3 by gear 4 when the motor is the source of power tends to loosen spring 99 and throw out the clutch. Thus, when the motor is driving the camera the manual handle is not driven thereby.

Figure 15:
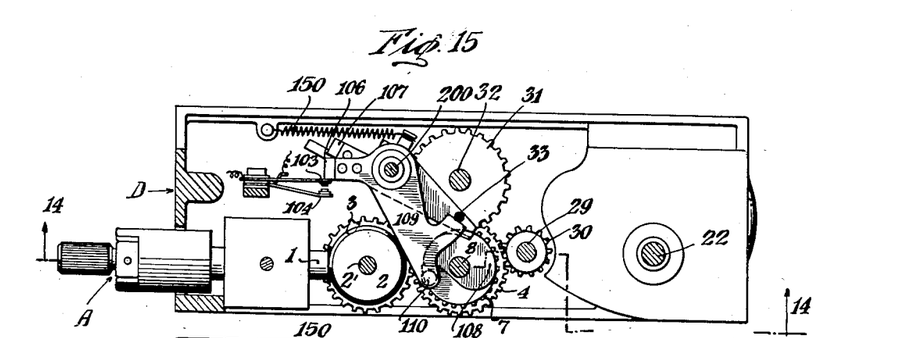
Figure 15 is a view in section taken along line 15—15 of Figure 14.
Figure 16:
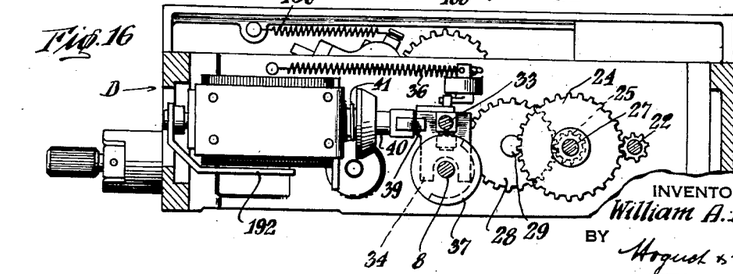
Figure 16 is a view in section taken along line 16—16 of Figure 14.
Figures 17, 19:
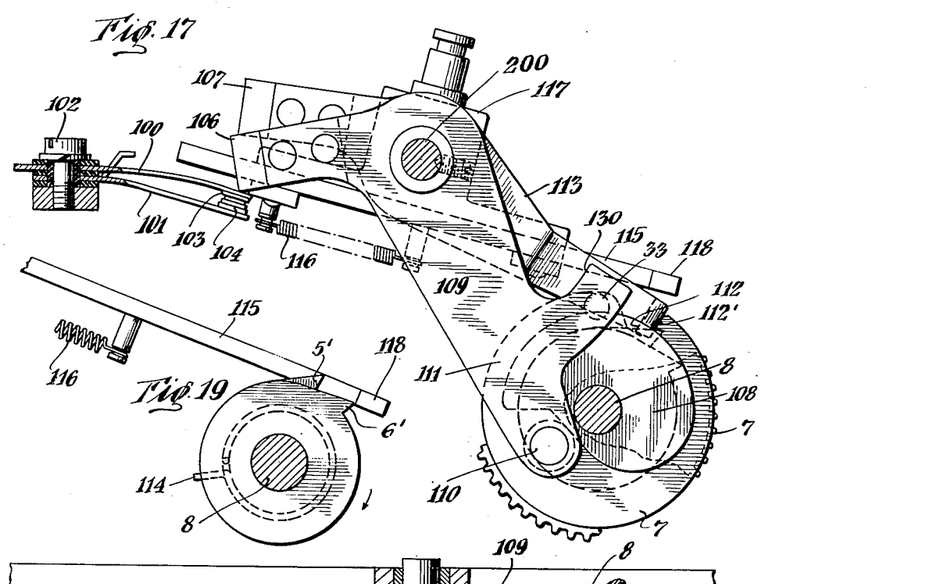
Figure 17 is a detailed view of the motor switch actuating device.
Figure 19 is a view in section taken along line 19—19 of Figure 18.
Figure 18:
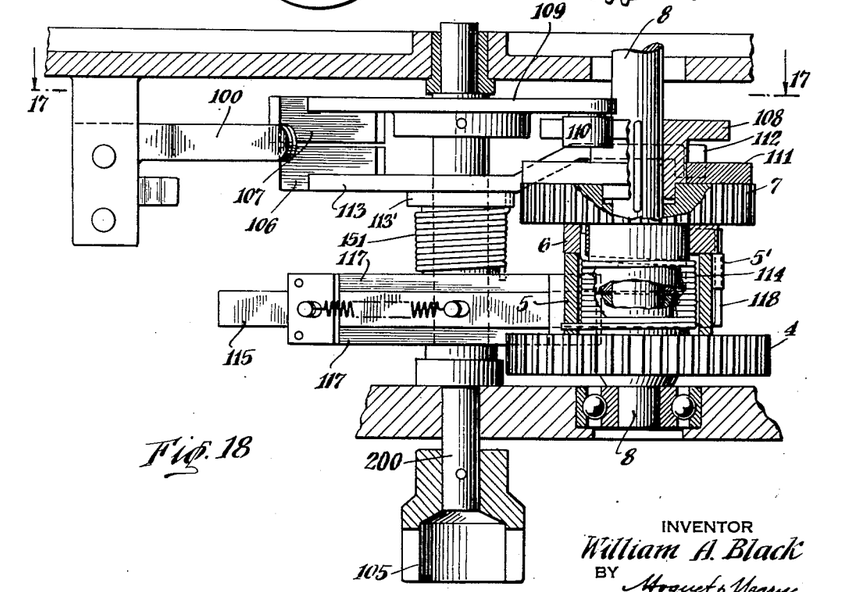
Figure 18 is an enlarged view partly in vertical section and partly in side elevation of the switching device for the motor.

Referring to Figs. 15, 17 and 18, the clutch device previously referred to as 5, 6 comprises a sleeve 5 loosely mounted on shaft 8 and a sleeve 6 fixed to shaft 8 so as to be rotated thereby. Arranged interiorly of sleeves 5 and 6 is a coil spring 114 secured at one end to sleeve 5 and at its other end to sleeve 6. The shaft 8 is divided and arranged with abutting hubs interior of sleeve 5. As the power is transmitted to the lower hub shaft 8 through the medium of the gear 4 in a clockwise direction during the film winding operation, the rotation of the lower hub brings about a tightening of coil spring 114 about the two hubs and effects a drive of the upper hub of shaft 8 by the lower as the tension of the spring increases. In order to release the clutch 5, 6 so as to stop the winding mechanism after one complete revolution of shaft 8, which constitutes one cycle of operation of the film and shutter winding mechanisms, an arm 115 is provided which is normally urged to the left, as shown in Figure 19, by the tension spring 116 and slidably mounted in the housing 117, which is fixed to a shaft 200, as shown in Fig.

17. The swinging motion of the assembly is controlled by the movement of the arm 109 and roller 110 carried thereby to bear on cam 108. The arm 115 is provided with an upward extension 118, which is adapted upon the rotation of shaft 8 to first engage a projection 6' on the upper fixed sleeve 6 and as the clockwise rotation continues, arm 115 will be drawn against the action of the tension spring 116 and this movement to the right, as shown in Figure 19, will continue until the projection 6' rides off of its point of engagement with the arm 115, at which time spring 116 draws the arm 115 backwards until it engages with a similar projection 5' on the loosely mounted sleeve 5 which has the effect of lessening the tension on spring 114 so as to throw out the clutch so that further rotation of the gear 4 has no driving effect on the shaft 8.

Referring more particularly to Figs. 15, 17, and 18, there is provided a switching device for automatically cutting off the motor drive and starting it up again during the cycle of operation of the camera and the repetition of such cycle. This switch consists of leaves 100 and 101 spaced apart, for opening the circuit, the leaves being conveniently secured to the casing 102, with suitable lead wires extending therefrom to complete the electrical system. In order to effect an engagement of the two contacts 103 and 104, carried respectively by the spring leaves 100 and 101, there are provided a pair of hinged members fixed to a common rotary shaft 200 and terminating in insulating blocks 106 and 107 arranged adjacent each other, so that either member when moved to a predetermined point in a counterclockwise direction is adapted to force the upper contact 103 into engagement with lower contact 104 to close the circuit. The primary purpose when using the camera as an automatic one is to start the motor and to wind the film and the shutter after the vacuum has been destroyed, and the film released from the retaining effect thereof. In order to maintain this proper sequence of operation, there is provided a cam 108 carried by the film winding shaft 8 and rotatable with a gear 7 also carried thereby. Fixed to the shaft 200 is a pivoted member 109, terminating at its one end in an insulating block 106, and at its other end in a roller 110, which rides on the face of the cam 108. Immediately above the gear 7 is arranged another cam 111 carried by shaft 8, so as to receive a lug 112 bearing against the outer face thereof, the lug 112 being formed on one extremity of an arm 113 loosely mounted on the shaft 200 and having its other extremity formed of an insulating block 107. This lug 112 rides on the outer face of the cam 111, which latter is provided with a notch 112' for engagement by the lug 112.

As the shaft 8 turns in a clockwise direction during the winding of the film, roller 110 rides up along the face of the cam 108 and when in the position shown in Fig. 17, or as a matter of fact, when either of the insulating blocks 106 and 107 bear down sufficiently on contact 103, the circuit remains closed and the motor is operating. However, as a quick interruption or breaking of the motor circuit is required, a second cam, which has a circumferential face except for a notch 112', brings up the extension 112 and therewith brings insulation block 107 immediately in engagement with contact 103 against the action of spring 100 to maintain the motor circuit closed.

Before that takes place and at a short interval before block 106 starts to allow the contacts 103 and 104 to become separated after arm 106 leaves its position, block 107 returns to contact through a whole period of complete revolution and at the end, extension 112 will suddenly snap into notch 112' of cam 111 and therefore cause a sudden interruption of the circuit and stop the motor immediately after winding operations have been completed.

As the film is wound either manually or by motor through the train of gears and shafts previously described, to impart rotary motion to gear 21 for the film winding spool, the shutter is also wound through the rotation of shaft 8 and shaft 32 and the consequent rotation of collar 106 and through a suitable releasable connection a rotation of shaft 120. This shaft 120 may have a releasable connection to a collar 121 carrying a gear 122, meshing with gear 123, to rotate a shaft in cylinder 124 for winding a shutter located within the frame 125. In this connection lug 112 performs the additional function of preventing a back winding of the shutter after the clutch 5, 6 is released until the shutter tripping device is actuated.

Figure 6:
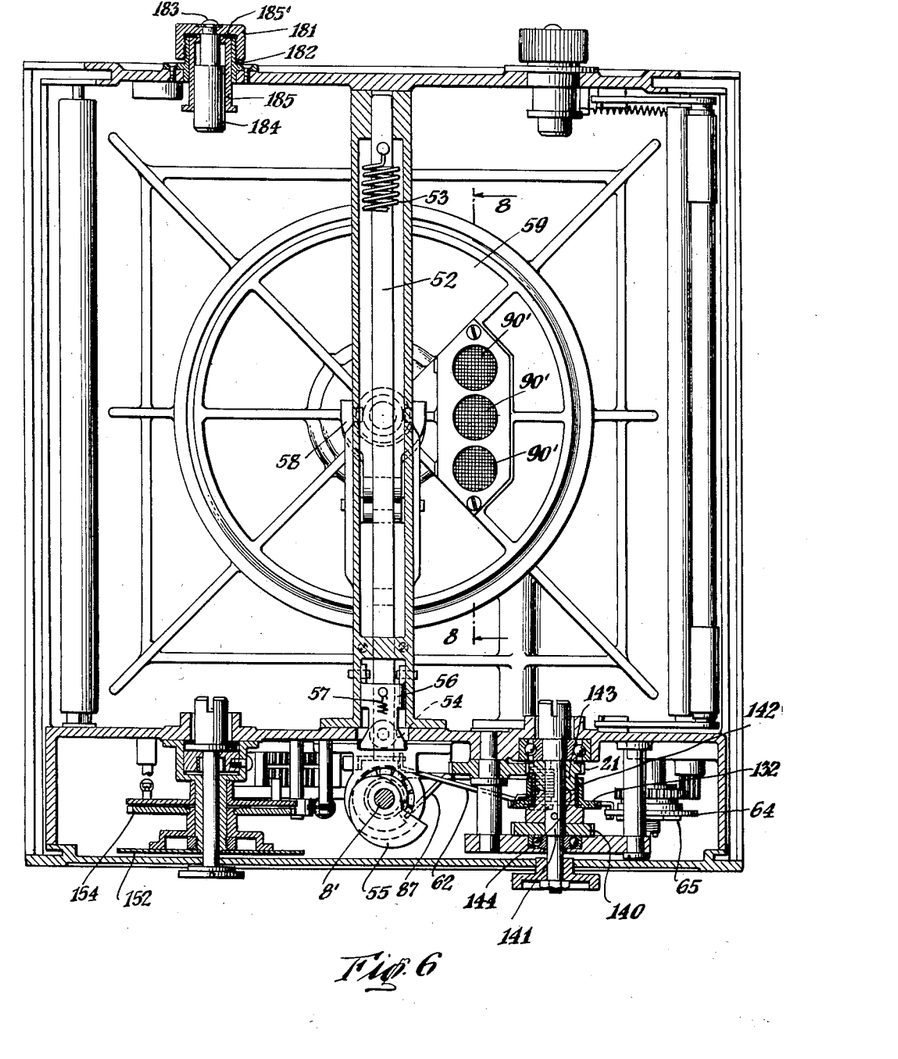
Figure 6 is a top plan view of the magazine unit with the top cover and film rolls removed.
Figure 7:
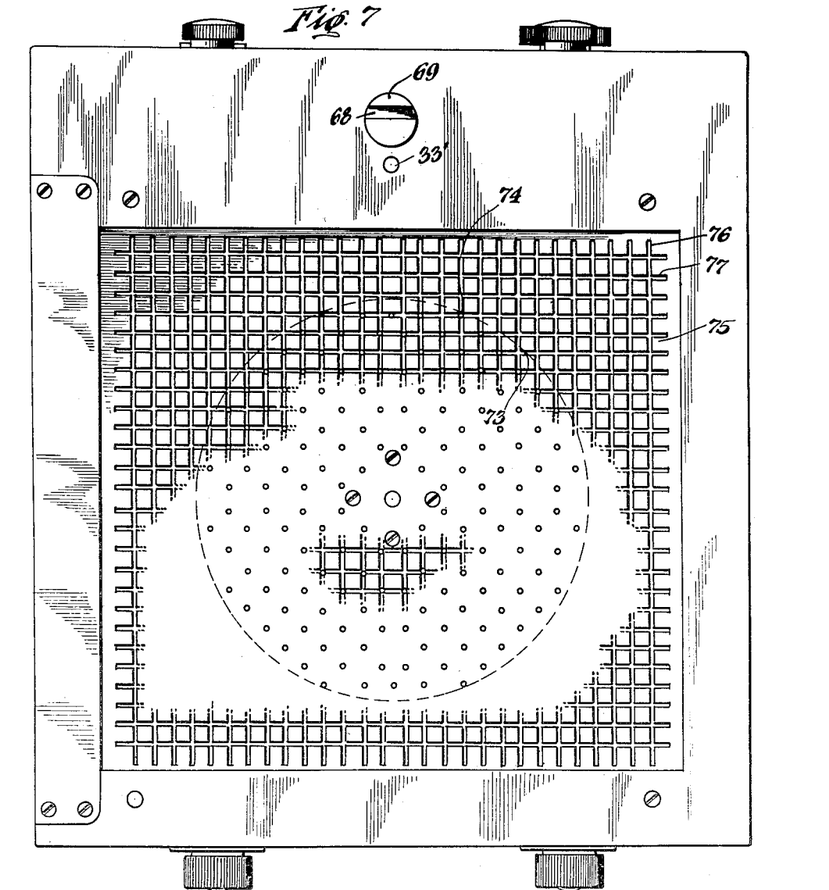
Figure 7 is a bottom plan view of the vacuum plate.
Figure 8:
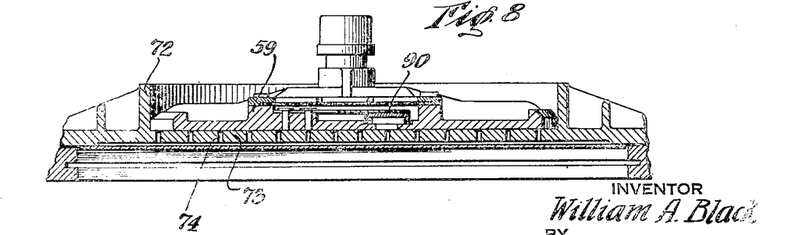
Figure 8 is a view in section taken along line 8—8 of Figure 6.

As previously described, the gear 21 carries the film winding spool 21' and in order to prevent a backward winding of the film, another gear 140, see Figs. 4 and 6, is also fixed to the same shaft 141 and pawls 126 and 128 with springs 127 and 129 are provided so as to engage the teeth of gear 141 for this purpose. As the film winding operation continues the lug 63' of the arm 63 rides on the face of the measuring roll 64 keeping the pawl 131 on the end of arm 130 out of engagement with ratchet 132 carried by the film winding roll 21'. As soon, however, as the lug 63' drops into the corresponding notch in the measuring roll, as shown in Fig. 4, the arm 130 is urged counterclockwise so as to bring pawl 131 into engagement with ratchet 132 and prevent further clockwise rotation of the film winding roll. The measuring roll thus effectively measures the amount of film to be advanced during each cycle of operation of the camera. This is brought about by means of a clutch comprising a spring 142 resting on a sleeve 143 of gear 21 and on a sleeve 144 and as long as ratchet 132 is free to rotate, the spring is wound around the adjacent sleeves and in binding the same, acts as a drive to impart a rotation to shaft 141 from gear 21. Whenever the ratchet 132 is held by the pawl 131 a further rotation of gear 21 tends to unwind spring 142 so as to throw out the clutch and release the driving action of the spring.

Also, during each film winding operation and shutter wind, the piston of the vacuum system is being moved downwardly, the vacuum having been destroyed, and this downward movement is caused by operative connection between the operation of cam 55 against the roller 54 to move the bar 52 to operate the bellcrank 58.

Figures 10, 11, 12:
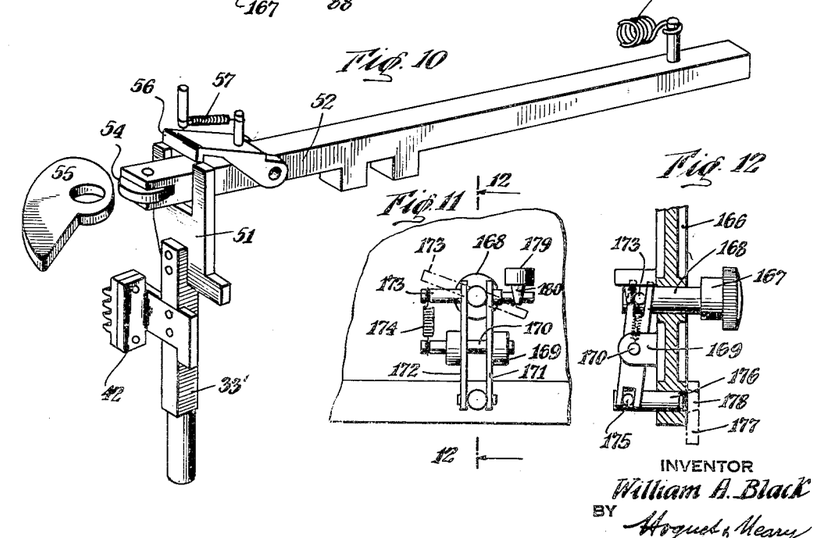
Figure 10 is a detailed view in perspective of the actuating mechanism for the vacuum creating device.
Figure 11 is a view in detail, taken from the interior, of the knob for retaining the magazine cover.
Figure 12 is a view in section taken along line 12—12 of Figure 11.

Figure 15 shows the parts in the position that they assume in readiness for the tripping of the shutter, at which time the motor is inoperative as the contacts 103 and 104 are separated so as to open the motor circuit. The lower extension of plunger 33 is in its full down position so as to rest behind the arm 109 fixed to the shaft 200 for tripping the shutter and the entire mechanism is blocked against any further movement until the shutter is actually tripped. As this is done, either manually or automatically as the case may be, the first thing that occurs on the upward movement of plunger 33' is the removal of the catch 56 from the end of the bar 52, which latter under the spring action of tension spring 53 is moved sharply to the left, as shown in Figure 10, this movement of the bar 52 resulting in the sudden raising of the piston through the medium of bellcrank 58, as previously described, in order to apply the vacuum to the film to hold the latter flat over the exposure area. The next operation which follows is the raising of the lower extension of the plunger 33 from behind the arm 109, that is from the position shown in Figure 15, allowing the arm 109 to snap quickly over in a counterclockwise direction under the action of spring 150. Inasmuch as arm 109 is fixed to the rotary shaft 200, the latter moves in a corresponding direction and operates the shutter trip 105. Then upon the final upward movement of plunger 33, 33' the lower, straight arm 86 of the vacuum regulating valve 82 is allowed to pass under the plunger 33' which has until this time prevented the movement of the latter about its pivot 85 so as to open the valve 82 and allow the vacuum to be destroyed so as to be in readiness for the next film winding operation to begin the next cycle of operation of the camera. These different steps in the operation of the camera immediately above described must follow in their proper sequence and there must also be a definite time interval consumed by each one in order to produce a proper operation of the camera, and it is for this purpose that the pallet retard is primarily intended, the retard consisting of a rack 42 carried by the plunger 33', and through means previously described, the speed of movement of the plunger will be regulated by the pallet wheel 46 and the pallet bar 47.

Prior to the release of arm 109 from its position shown in Figure 15, the roller 110 of arm 109 is entirely out of contact with cam 108 and as soon as plunger 33 is released from this position by the operation of the shutter trip, the extent of movement of arm 109 in effecting the tripping of the shutter is limited to the engagement of roller 110 with the cam 108, as shown in Figure 17, which shows the parts in their respective positions immediately after the camera has been tripped, it being seen that this counterclockwise movement of arm 109 results in the engagement of the block 106 with the spring 100, so as to bring the motor circuit contacts 103 and 104 into engagement so as to close the circuit and again start the motor. At the same time the clutch 5, 6 is brought into engagement by the movement of arm 115 in a counterclockwise direction. A rotation of the shaft 8 in a clockwise direction results in a corresponding rotation of cams 108 and 111. After the shutter has been tripped, the parts assume the positions, as shown in Fig. 17, the motor circuit being closed by the engagement of block 106 with contact which is pressed into engagement thereby with contact 104 and this continues as long as roller 110 is riding the low surface of cam 108. Before roller 110 reaches the high part of cam 108 so as to relieve the pressure of block 106 on the leaf 100, the lug 112 has risen out of notch 112' and the block 106 is forced down on leaf 100. Thus block 106 acts alone to keep the contacts closed as block 107 is drawn away as the roller 110 rides on the high part of cam 108. The motor is stopped upon the completion of the film winding and shutter winding cycle and the engagement of the plunger 33 behind the projection 130 of arm 109, the lug 112 having previously dropped into notch 112', keeps the blocks 106 and 107 away from the motor switch contacts and keeps the circuit open. The movement of arm 109 caused by the rotation of cam 8 brings arm 115 into such position that the extension 118 is in line and will be grasped by the catch 6' of the clutch member 6 as the latter is rotated into position to be engaged by the extension. As explained before, the catch 6' of the driving element of the clutch carries the arm 115 with it until the catch 6 rides out of the extension so as to allow the latter to be drawn backward by the spring 116, to engage the catch 5', the effect of which is to throw out the clutch and relieve the operating parts of any further action by the rotation of shaft 8. In order to maintain the loosely mounted arm 113 into such position that it will ride on the face of the circumferential cam 111, a suitable spring 151 may be coiled about the shaft 2' and be connected at its one end to a sleeve 113' carried by the arm 113, and at its other end to the block 117.

The replacement of the piston to its normal downward position is brought about during the winding of the film by the rotation of shaft 8 and the cam 55 carried and rotated thereby to bear against the roller 54, urging the bar 52 towards the right until the catch 56 is in position to drop down by the extremity of the bar under the urging of the spring 57 which occurs as soon as the upward extensions of the plate 51 of the plunger 33' is moved sufficiently downward to allow this pivotal action of the catch.

As shown in Figures 3 and 4, there is provided a counter device 152 consisting of a dial 153 and a ratchet 154 normally urged by a spiral spring not shown, in a clockwise direction. There is further provided a pivoted arm 156 adapted to be engaged by cam 55 as the latter is rotated by the main shaft 8. This member 156 terminates in a pawl 157 from engagement with the ratchet and there is also provided another pawl and spring 158 and 159 also for engagement with the ratchet, to prevent clockwise rotation thereof, so that each time the cam 55 strikes the pawl 156, the latter moves the counter ratchet one notch in a counter-clockwise direction and the latter is held against rotation in a backward direction by means of pawl 158.

Immediately beneath the counter ratchet 152 is arranged a plate 159 with a pair of notches 160 and 161. The plate also carries a pin 163 adapted for engagement by a pin 164 which extends through the magazine and is loosely engaged by the magazine cover 165 when placed on the magazine. In the position shown in Figures 3 and 4, the pin 164, in its engagement with the pin 163, keeps the plate and its notches in such a position as to allow the pawls 157 and 158 to actuate to their full extent so that the operation of the counter above described will continue in its proper sequence. When, however, the magazine cover is removed, there is no further down pressure on the pin 164 and the action of spring 155 on the plate forces the plate in a counterclockwise direction, and in doing so, brings notches 161 and 160 out of registry with the pawls 158 and 163' so that they are no longer capable of preventing this clockwise movement. This leaves the plate and ratchet free to rotate to a predetermined zero position. This makes for a material convenience in that each time the magazine cover is removed and film placed therein, and the cover is again put in place, there is removed the necessity of making sure that the counter is set at a zero position prior to the taking of a series of pictures. After a complete revolution of the counter device to its limit a bracket 162, carried by the ratchet, acts to force the pawl 157 away from the ratchet so as to prevent further movement and consequent jamming.

Figure 21:
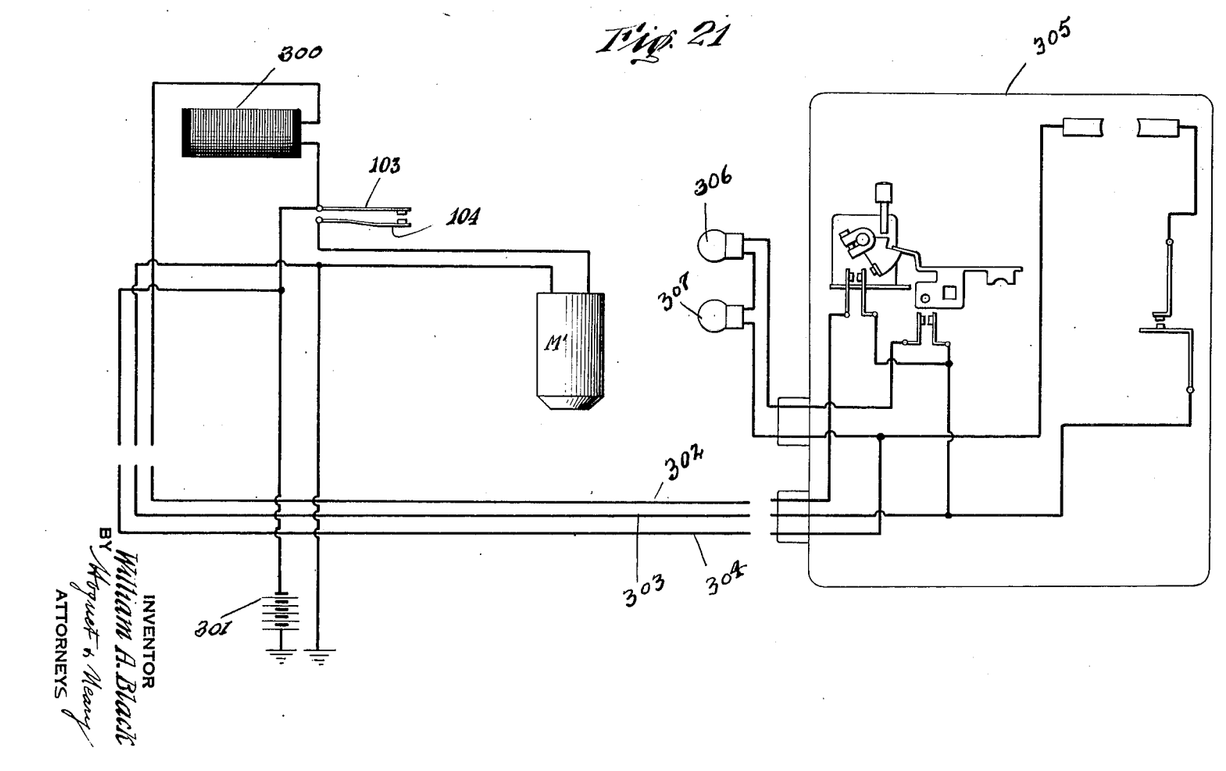
Figure 21 is a wiring diagram of the device showing its relationship to an intervalometer and signal lights.

Figure 21 illustrates in a general way a form of wiring diagram for the device in which the current supply is the battery 301 for driving the motor M' and which supplies electrical energy to the solenoid when the solenoid circuit is completed by the engagement of the make and break contacts 103 and 104. Forming no part of the present invention it might be added that the lead wires 302, 303 and 304 after passing through the camera from the electrical source 301 may be led to a suitable intervalometer arrangement contained in the square generally indicated by the reference characters 305 and also to the signal lights 306 and 307. The intervalometer is for the purpose of predetermining and maintaining a definite interval between the taking of pictures and may include certain switch devices for completing certain circuits for bringing about a predetermined operation of the camera. The lights 306 and 307 are in substantially the same type of circuit and for the same purpose as set forth in the U. S. Patent to Lewis McSpaden, patented September 16, 1930, Number 1,775,731, for Warning signals.

As a further means of refinement there is provided a novel and a fool-proof arrangement for securing the magazine in place on the main body of the camera. This may consist, as shown in Figures 11 and 12, of a magazine side plate 166 in which there is located a manual turning knob 167 with a shaft 168. The plate 166 has arranged interiorly thereof a bracket 169 provided with a pin 170 on which are pivoted a pair of bars 171 and 172. There is also carried by the shaft 168 an arm 173 between one end of which and the adjacent end of the shaft 170 is arranged a tension spring 174. The lower end of arms 171 and 172 are forked to loosely receive a pin 175 secured to a sliding pin 176 for moving the same inwardly and outwardly in the corresponding opening provided for it in the plate. There is represented in Figure 12, at 177 in dotted lines, a fragmentary portion of a flange of the camera driving unit casing, and this is provided with an aperture 178, which the pin 176 is adapted to engage when the latter is moved outwardly to lock the plate in its proper place. There is also provided on the interior face of the plate 166 a bracket 179 with a depending conical lug 180. Figure 12 shows the lock in inoperative position but as the knob 167 is turned, the arm 173 is moved into a diagonal position, such as shown in dotted lines Figure 11, and as the knob 167 is pushed inwardly, the pin 176, in its engagement with the aperture 178, flange 177, effects a fastening thereof in its proper place, and in order to lock the plate in such position it is merely necessary to release the knob and the spring 174 will bring the arm 173 behind the lug 180 so as to lock it in such position.

As a still further refinement of the invention there is provided, as shown in Figure 6, turning knobs for the film spools, each of which is constructed in the same manner. For instance, the knob 181 is interiorly screw-threaded to engage a stationary part 182. The knob has secured thereto at 183 a plunger 184, which latter forms the support for the film spool. In order to provide for a saving of space and for eliminating as far as possible all unnecessary protrusions from the general outline of the film magazine, there is provided between the plunger 184 and the stationary sleeve 182 a sleeve 185 which is slideable with relation to both the plunger 184 and the magazine casing.

Figure 1:
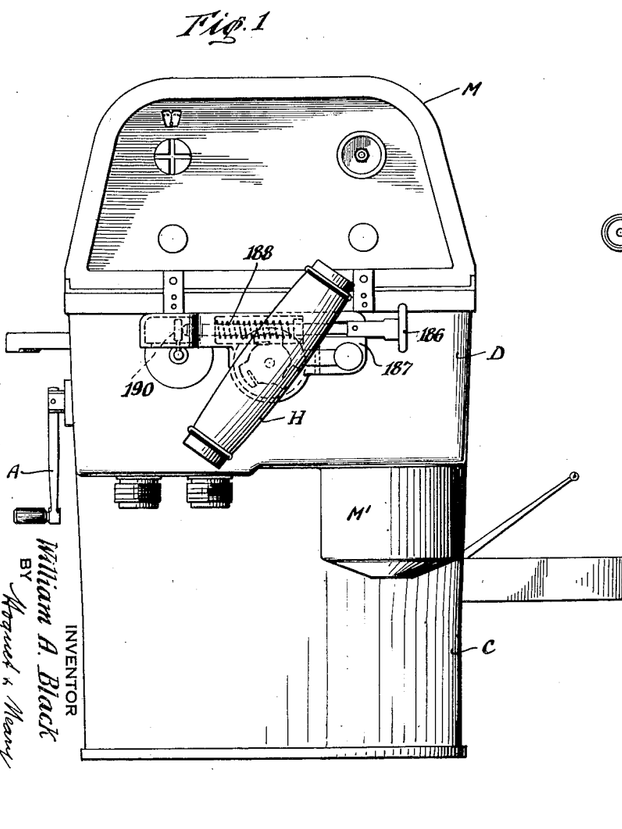
Figure 1 is a view in side elevation of the camera.
Figure 2:
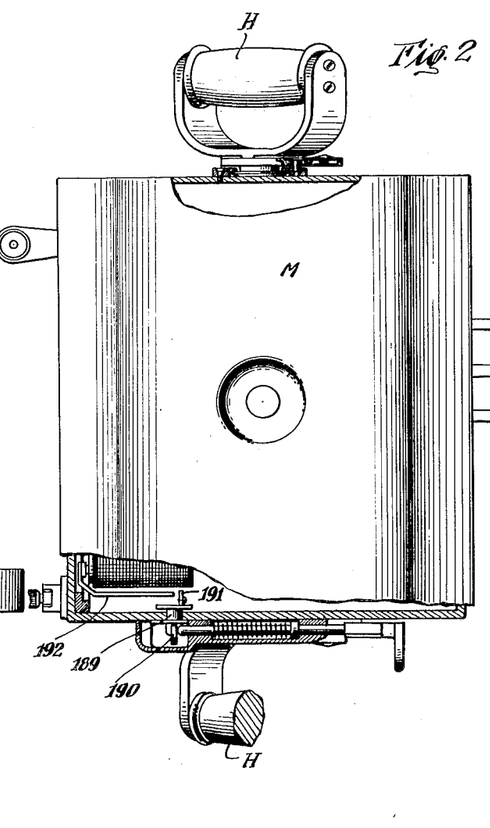
Figure 2 is a top plan view of the camera.

In order to bring about the manual tripping of the camera, there is conveniently arranged adjacent one of the handles a device for tripping the shutter without removing the grasp from the adjacent handle. This tripping device may consist of a tripping lever 186 slideably carried by a stationary bracket 187. This lever is normally urged outwardly to the right, as shown in Figure 1, by means of a compression spring 188 in position for tripping. As the tripping lever is compressed it acts upon a suitable device, such as shown as comprising a rotary member 189 provided with a lug 190 for engagement by the inner end of the tripping lever. Such an engagement causes a rotation of the member 189 and a lug 191 carried thereby, which latter strikes against an arm 192 carried by the solenoid shaft 40. The effect of this operation is not to immediately cause a photographic exposure but is, on the contrary, to release the solenoid catch 39 from the forked arm 34 of the plunger 33, 33', and the result is the operation of the vacuum system, the tripping of the shutter, the release of the vacuum and the restarting of the motor in their proper sequence, as has been previously described.

I claim:

1. In combination in a film camera, a self-contained cylinder and piston unit located immediately adjacent the focal plane of said camera, means operated by the mechanism of said camera for operating the piston to create a vacuum and a consequent suction in said unit for holding the film flat over the exposure area of said camera.

2. In combination in a film camera, means for simultaneously winding the film and the shutter of said camera, and a self-contained unit including a cylinder and a piston located immediately adjacent the focal plane of said camera, means operated by the mechanism of said camera for operating said piston and creating a consequent suction for holding the film flat over the exposure area of said camera, means for tripping said shutter and means regulated by the operation of said film winding means and said shutter tripping means for controlling said vacuum creating means so that the latter will be effective during the photographic exposure and ineffective during the remainder of the cycle of operation of said camera.

3. In combination in a film camera, means for simultaneously winding the film and the shutter of said camera, and self-contained means for creating a vacuum and a consequent suction for holding said film flat over the exposure area of said camera, said means comprising a cylinder and a piston operating therein, normally held in operative position, a reciprocatory member actuated by said film winding means for bringing said piston into an inoperative position and means actuated by said shutter tripping means for allowing said piston to return to an operative position to hold the film flat over the exposure area during the exposure period and to release the same during the remainder of the cycle of operation of said camera.

4. In combination in a film camera, means for simultaneously winding the film and the shutter of said camera, a self-contained vacuum system including a piston in a cylinder carried by said camera, means for normally urging said piston into an upward position for creating vacuum in said cylinder, a reciprocatory member actuated by the operation of said film winding means for moving said piston downwardly during the operation thereof, valve means for said cylinder also adapted to be controlled by said member, said shutter tripping means being connected to said member to release the same upon operation to close said valve and return said piston to an upward position and to subsequently effect a photographic exposure.

5. In combination in a film camera, motor actuated means for simultaneously winding the film and the shutter of said camera, a measuring roll and a clutch means carried thereby and connected to said film winding means so as to predetermine the amount of film to be advanced during each film winding operation regardless of the extent of operation of said film winding means, a motor circuit having a contact device including cam actuated operating members for opening and closing said circuit, a driving clutch carried by said film winding means and adapted to be thrown out at the completion of said film winding operation so as to render ineffective any further operation of said motor prior to the operation of the devices for opening said motor circuit.

6. An aerial film camera composed of separable units comprising a magazine, a camera body and a lens cone, a self-contained vacuum creating unit including a pump carried by said magazine immediately adjacent the focal plane of said camera and operated by the mechanism of said camera for keeping the film flat over the exposure area of said camera, releasable connections between said body and said lens cone for tripping and winding the shutter of said camera and releasable connections between said body and said magazine for winding said film and operating said vacuum unit.

7. In an aerial film camera, an exposure opening, a film feeding and shutter operating means, a self-contained means for keeping the film flat over said exposure opening, all of said means, including mechanism so interdependently related as to predetermine the sequence of a series of operations thereof, said film holding means including a piston and a cylinder carried by the magazine of said camera immediately adjacent the focal plane of said camera and means for actuating the piston at predetermined intervals, regulated by the operation of said film advancing and shutter tripping means to alternately operate the piston to create suction to hold the film flat over the exposure opening by suction and to exhaust the suction to release the film so that it may be advanced.

8. In an aerial film camera, a camera body, driving mechanism carried thereby, a magazine removably mounted on the camera body, a self-contained vacuum system arranged immediately adjacent the focal plane of the camera and including a pump operated by the mechanism of said camera for holding the film flat over the exposure area during exposure, changing mechanism carried by the magazine, and synchronizing driving connections between said mechanism in said magazine and body composed of separable parts carried thereby.

9. In combination in a film camera, a self-contained vacuum creating unit arranged immediately adjacent the focal plane of said camera and including a pump operated by the mechanism of said camera for holding the film flat over the exposure opening of said camera, means for winding said film, a shutter, and means for winding and for tripping the same, means set into operation by the tripping of said shutter for causing said unit to operate and create vacuum prior to the photographic exposure and for destroying the vacuum thereafter.

10. In combination in a film camera, means for winding the film and means for winding and for tripping the shutter, a self-contained vacuum creating unit arranged immediately adjacent the focal plane of said camera and including a pump operated by the mechanism of said camera, and to hold the film flat over the exposure opening of said camera prior to and during the exposure and for releasing the same thereafter, said pump being under control of said shutter tripping means for its effective operation and under the control of said film winding means to return it to such position where it will be under control of said shutter tripping means.

11. In combination in a film camera, means for advancing the film, means for tripping and for winding said shutter, a self-contained vacuum creating unit and means for operating the same to hold the film flat over the exposure opening of said camera prior to and during exposure and for releasing the same thereafter, a motor for actuating said film advancing and shutter and winding means, means under the control of said shutter tripping means for putting into operation said vacuum creating unit, for tripping said shutter, and for re-starting said motor in the sequence thus designated, and means controlled by the film and advancing means for returning said vacuum unit to an inoperative position so as to be held in check by said shutter tripping means, in readiness for the subsequent cycle of operation.

12. In combination in a film camera, means for advancing the film, means for tripping and for winding said shutter, a self-contained vacuum creating unit and means for operating the same to hold the film flat over the exposure opening of said camera prior to and during exposure and for releasing the same thereafter, a motor for actuating said film advancing and shutter and winding means, means under the control of said shutter tripping means for putting into operation said vacuum creating unit, for tripping said shutter, and for re-starting said motor in the sequence thus designated, and means controlled by the film and advancing means for returning said vacuum unit to an inoperative position so as to be held in check by said shutter tripping means, in readiness for the subsequent cycle of operation, said means for starting and stopping said motor comprising cams carried by the driving means of said film advancing means and levers carried by the shutter actuating means, and regulated by said cams for closing and opening of the circuit for operating said motor.

13. In combination in a film camera, means for advancing the film, means for tripping and for winding said shutter, a self-contained vacuum creating unit and means for operating the same to hold the film flat over the exposure opening of said camera prior to and during exposure and for releasing the same thereafter, a motor for actuating said film advancing and shutter and winding means, means under the control of said shutter tripping means for putting into operation said vacuum creating unit for tripping said shutter, and for re-starting said motor in the sequence thus designated, and means controlled by the film and advancing means for returning said vacuum unit to an inoperative position so as to be held in check by said shutter tripping means, in readiness for the subsequent cycle of operation, and a retard mechanism for actuation by said vacuum unit operating means for defining a definite predetermined time interval between the vacuum unit operation, the tripping of the shutter and the re-starting of the motor.

14. In combination in a film camera, means for advancing the film, means for tripping and for winding said shutter, a self-contained vacuum creating unit and means for operating the same to hold the film flat over the exposure opening of said camera prior to and during exposure and for releasing the same thereafter, a motor for actuating said film advancing and shutter and winding means, means under the control of said shutter tripping means for putting into operation said vacuum creating unit for tripping said shutter, and for re-starting said motor in the sequence thus designated, and means controlled by the film and advancing means for returning said vacuum unit to an inoperative position so as to be held in check by said shutter tripping means, in readiness for the subsequent cycle of operation, said means for starting and stopping said motor comprising cams carried by the driving means of said film advancing means and levers carried by the shutter actuating means, and regulated by said cams for closing and opening of the circuit for operating said motor, and a retard mechanism for actuation by said vacuum unit operating means for defining a definite predetermined time interval between the vacuum unit operation, the tripping of the shutter and the re-starting of the motor.

15. In combination in a film camera, means for advancing the film, means for tripping and for winding said shutter, a self-contained vacuum creating unit and means for operating the same to hold the film flat over the exposure opening of said camera prior to and during exposure and for releasing the same thereafter, a motor for actuating said film advancing and shutter and winding means, means under the control of said shutter tripping means for putting into operation said vacuum creating unit, for tripping said shutter, and for re-starting said motor in the sequence thus designated, and means controlled by the film and advancing means for returning said vacuum unit to an inoperative position so as to be held in check by said shutter tripping means, in readiness for the subsequent cycle of operation, and a retard mechanism for actuation by said vacuum unit operating means for defining a definite predetermined time interval between the vacuum unit operation, the tripping of the shutter and the re-starting of the motor, a measuring roll for predetermining the extent of film to be advanced during each cycle of operation and being operatively associated with the film advancing means and the means for operating said vacuum creating unit.

16. In combination in a film comera, means for advancing the film, means for tripping and for winding said shutter, a self-contained vacuum creating unit and means for operating the same to hold the film flat over the exposure opening of said camera prior to and during exposure and for releasing the same thereafter, a motor for actuating said film advancing and shutter and winding means, means under the control of said shutter tripping means for putting into operation said vacuum creating unit, for tripping said shutter, and for re-starting said motor in the sequence thus designated, and means controlled by the film and advancing means for returning said vacuum unit to an inoperative position so as to be held in check by said shutter tripping means, in readiness for the subsequent cycle of operation, said means for starting and stopping said motor comprising cams carried by the driving means of said film advancing means and levers carried by the shutter actuating means, and regulated by said cams for closing and opening of the circuit for operating said motor, and a retard mechanism for actuation by said vacuum unit operating means for defining a definite predetermined time interval between the vacuum unit operation, the tripping of the shutter and the re-starting of the motor, a measuring roll for predetermining the extent of film to be advanced during each cycle of operation and being operatively associated with the film advancing means and the means for operating said vacuum creating unit.

17. In combination in a film camera, means for advancing the film, means for tripping and for winding said shutter, a self-contained vacuum creating unit and means for operating the same to hold the film flat over the exposure opening of said camera prior to and during exposure and for releasing the same thereafter, a motor for actuating said film advancing and shutter and winding means, means under the control of said shutter tripping means for putting into operation said vacuum creating unit, for tripping said shutter, and for re-starting said motor in the sequence thus designated, and means controlled by the film advancing means for returning said vacuum unit to an inoperative position so as to be held in check by said shutter tripping means, in readiness for the subsequent cycle of operation, and a retard mechanism for actuation by said vacuum unit operating means for defining a definite predetermined time interval between the vacuum unit operation, the tripping of the shutter and the re-starting of the motor, a measuring roll for predetermining the extent of film to be advanced during each cycle of operation and being operatively associated with the film advancing means and the means for operating said vacuum creating unit, said vacuum creating unit comprising a piston and a cylinder and means operated by said film advancing means for effecting an instantaneous operation of said piston from an inoperative position to an operative one as the first effective operation of the camera device initiated by the tripping of said shutter tripping means.

WILLIAM A. BLACK.